Figure 1:
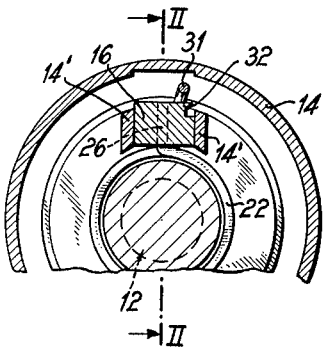

July 26, 1966 J. KELLER ET AL 3,262,533

CENTRIFUGALLY CONTROLLED COIL CLUTCH

Filed April 22, 1964 3 Sheets-Sheet 1

INVENTORS
Josef Keller
Hans Joachim Schwerdhöfer

July 26, 1966  J. KELLER ET AL  3,262,533
CENTRIFUGALLY CONTROLLED COIL CLUTCH
Filed April 22, 1964  3 Sheets-Sheet 2
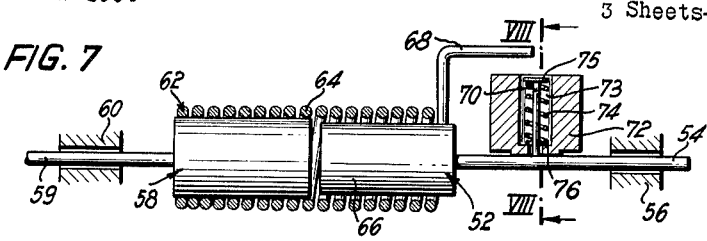
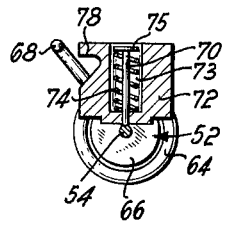
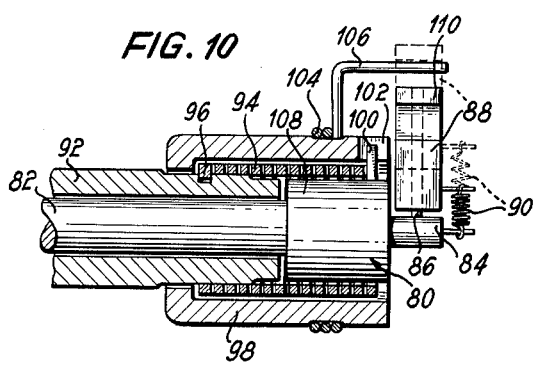
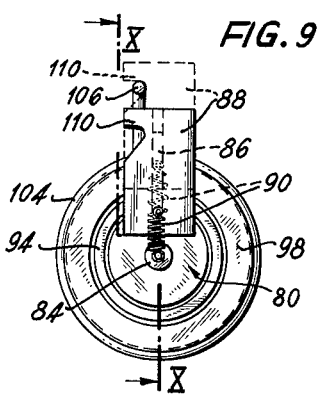
INVENTORS
Josef Keller
Hans Joachim Schwerdhöfer

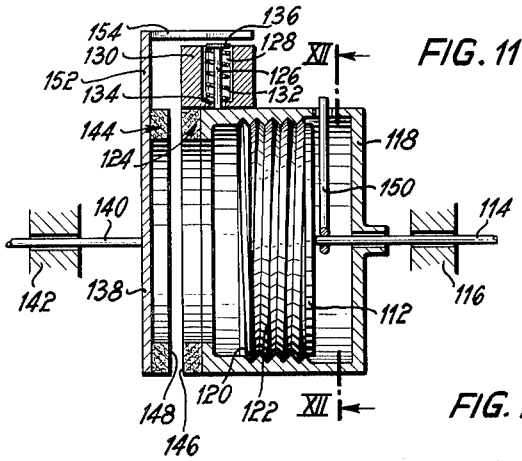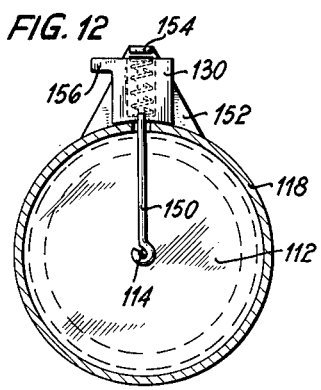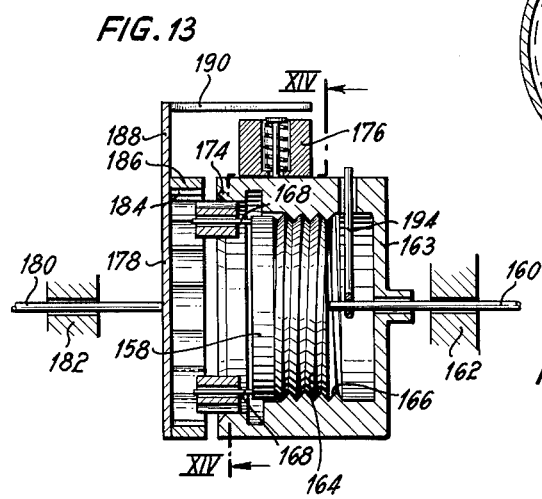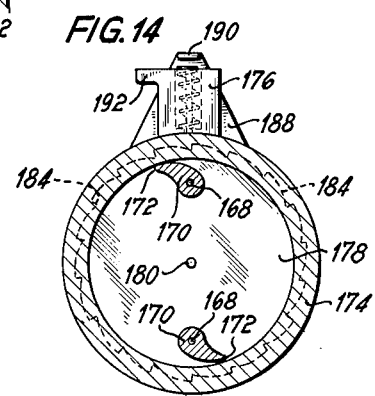

United States Patent Office 3,262,533
Patented July 26, 1966

3,262,533
CENTRIFUGALLY CONTROLLED COIL CLUTCH
Josef Keller and Hans Joachim Schwerdhöfer, Schweinfurt (Main), Germany, assignors to Fichtel & Sachs A.G., Schweinfurt (Main), Germany, a corporation of Germany
Filed Apr. 22, 1964, Ser. No. 361,698
Claims priority, application Germany, Apr. 23, 1963, F 39,554; Oct. 8, 1963, F 40,932
21 Claims. (Cl. 192—105)

This invention relates to clutches, and more particularly to clutches which are automatically engaged by a centrifugal control mechanism when the rotary speed of an input member of the clutch reaches a predetermined value.

Centrifugally controlled clutches of the type described are employed in automotive power trains and similar devices for connecting a motor, such as an internal combustion engine, to a load, such as the wheels of a vehicle. A clutch is employed to connect a motor-driven input shaft to a load-connected output shaft when the input shaft has been accelerated to a preset value. If the load absorbs a major part of the motor capacity, the rotary speed of the input shaft drops below the preset value upon connection with the load. The conventional centrifugal controls of known clutches respond to the decreased speed by disengaging the clutch.

Unless a centrifugally controlled clutch of the known type cooperates with a constant speed motor, such as a motor oversized for the intended purpose, the clutch engages and disengages repeatedly after the motor is started until the output shaft of the coupling reaches a speed similar to the preset speed of the input shaft.

This mode of operation creates cyclic torsional stresses in the clutch which unfavorably affect the useful life of the device.

An object of the invention is the provision of a centrifugally controlled clutch which avoids cyclic torsional stresses and the resulting rapid wear of the clutch without resorting to a constant speed motor.

A more specific object is the provision of a clutch which does not spontaneously disengage the input shaft from the output shaft as long as torque is transmitted between the shafts by the clutch, and regardless of the rotary speed of the input shaft.

With these and other objects in view, the invention in one of its aspects provides a clutch which has rotatable input and output members. Engageable coupling elements are operatively connected to each of these members, and are movable relative to each other toward and away from an engaged position in which they transmit torque to the output member when the input member rotates. A centrifugal weight is connected to the input member in such a manner that it moves about an axis when the input member rotates. The centrifugal weight is radially movable with respect to this axis. Yieldably resilient biasing means permanently urge the weight to move radially inward from an operative position remote from the axis toward an inoperative position adjacent the axis so as to hold the same in its inoperative position at rotary speeds below a predetermined speed, and to permit movement of the weight from the inoperative to the operative position in response to centrifugal forces at the predetermined speed. The coupling means are connected to the centrifugal weight in such a manner that they move into the engaged position when the centrifugal weight moves from the inoperative toward the operative position. Locking means which are responsive to the transmission of torque by the coupling elements from the input to the output member are provided for locking the centrifugal weight in its operative position at all rotary speeds below the afore-mentioned predetermined speed.

Figure 2:
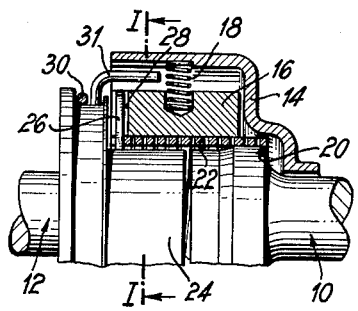
Figure 3:
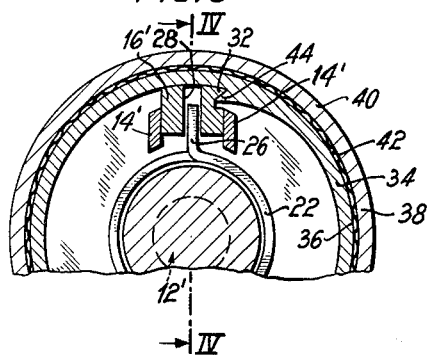
Figure 4:
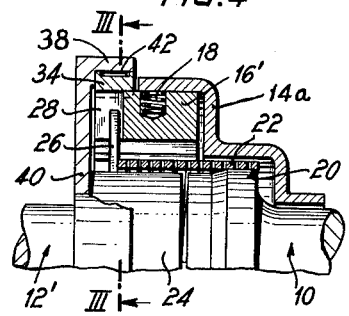
Figure 5:
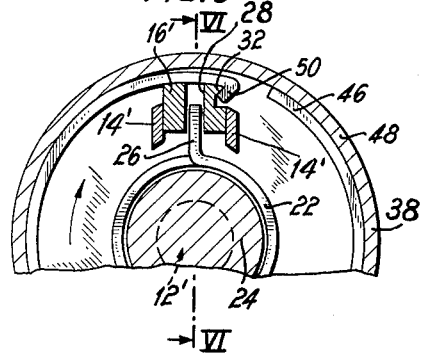
Figure 6:
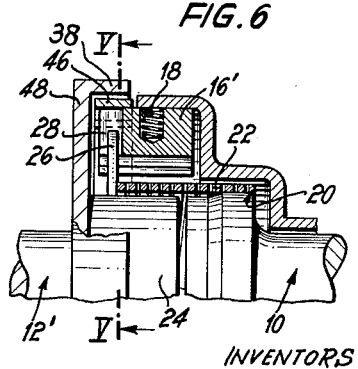

Other features and many of the attendant advantages of this invention will be readily appreciated as the same becomes better understood by reference to the following detailed description of preferred embodiments when considered in connection with the accompanying drawing in which:

FIG. 1 shows a clutch of the invention in radial section on the line I—I in FIG. 2;
FIG. 2 shows the clutch of FIG. 1 in axial section on the line II—II;
FIG. 3 is a radially sectional view of a modified clutch taken on the line III—III in FIG. 4;
FIG. 4 shows the clutch of FIG. 3 in axial section on the line IV—IV;
FIG. 5 illustrates a third embodiment of the invention in radial section on the line V—V in FIG. 6;
FIG. 6 is an axially sectional view of the clutch of FIG. 5 taken on the line VI—VI;
FIG. 7 shows yet another embodiment of the invention and associated driving and driven elements in section on the clutch axis;
FIG. 8 shows the clutch of FIG. 7 in radial section on the line VIII—VIII;
FIG. 9 is an axial end view of an additional embodiment of the invention;
FIG. 10 shows the clutch of FIG. 9 in side elevation, and partly in section on the line X—X;
FIG. 11 illustrates a further centrifugal clutch of the invention and associated elements in axial section;
FIG. 12 shows the clutch of FIG. 11 in section on the line XII—XII;
FIG. 13 shows a modification of the clutch of FIG. 11 in a corresponding view; and
FIG. 14 is a sectional view of the clutch of FIG. 13 taken on the line XIV—XIV.

Referring now to the drawing in detail, and initially to FIGS. 1 and 2, there is shown a clutch which has a driving or input shaft 10, and a driven or output shaft 12. The shafts are coaxial, and each shaft has several axial cylindrical portions of different diameter. An approximately cup-shaped housing 14 is coaxially and rotatably mounted on the input shaft 10. A centrifugal weight 16 is guided in a radial path within the housing 14 by guide portions 14' of the housing. A helical compression spring 18 is interposed between the housing 14 and the weight 16, and biases the latter toward the common axis of the shafts 10, 12. In the illustrated non-operative position of the weight 16, the clutch is disengaged.

One end 20 of a helical clamping or coupling spring 22 coaxial with the shafts 10, 12 is secured to an enlarged cylindrical portion of the input shaft 10. The coupling spring 22 is normally loosely coiled about an enlarged cylindrical contact or coupling face 24 of the output shaft 12. The free end 26 of the clamping spring 22 extends radially outward from the contact face 24 and is movably received in a radial groove 28 in a radial end face of the weight 16.

A helical wire spring 30 is coiled in frictional engagement about the cylindrical bottom of a groove in the output shaft 12. A locking end portion 31 of the friction spring 30 extends radially outward from the shaft 12, and then axially toward the input end of the clutch. In the inoperative position of the weight 16, the end portion 31 clears the weight during relative rotation of the shafts 10, 12, but the end portion 31 is in the path of the weight 16 when the latter is moved radially outward by centrifugal forces of sufficient magnitude to overcome the restraint of the spring 18. The weight 16 has a recess 32 dimensioned to receive the end portion 31. The recess is open in a circumferential direction, and its walls are obliquely inclined relative to a corresponding radius drawn through the common axis of the shafts 10, 12, and relative to a tangent corresponding to the radius.

The clutch illustrated in FIGS. 1 and 2 operates as follows:

When the driving or input shaft 10 rotates, the weight 16 is entrained by the coupling spring 22, and the rotary movement of the weight 16 is transmitted to the housing 14 by the biasing spring 18. At low rotary speeds, the weight 16 remains near the shafts 10, 12, and does not engage the locking end portion 31 of the friction spring 30.

As the driving speed increases, the weight, which rotates clockwise as viewed in FIG. 1, moves radially outward, and the free locking end portion 31 of the friction spring 30 is caught in the recess 32. The spring exerts a braking force on the weight 16, and thereby tightens the coupling spring 22 about the coupling face 24 of the driven shaft 12. Torque is transmitted by the spring 22 and the face 24 from the driving shaft 10 to the driven shaft 12.

If the motor or engine driving the shaft 10 slows down under the applied load, return of the weight 16 to its inoperative position under the urging of the biasing spring 18 is prevented by locking engagement of the free end portion 31 of the friction spring 30 with the radially outer locking wall of the weight 16 in the recess 32 as long as any significant torque is transmitted by the clutch.

The rate of automatic engagement of the clutch depends mainly on the frictional cooperation of the spring 30 with the output shaft 12. If the friction is properly selected, the clutch engages smoothly and without shock.

The embodiment of the invention illustrated in FIGS. 3 and 4 is closely similar to the first-described clutch, and identical reference numerals designate corresponding elements.

The input and output shafts 10, 12' are coupled by a clamping or coupling spring 22 in the illustrated operative position of the clutch. The spring 22 has an end portion 20 fixedly fastened to the shaft 10 and is tightened about a coupling face 24 of the shaft 12' by a centrifugal weight 16' closely similar to the weight 16 at a rotary speed high enough to permit the biasing spring 18 to be overcome by centrifugal forces acting on the weight 16'. The spring is abuttingly interposed between the weight 16' and a housing 14a.

The output shaft 12' carries a fixed flange 40 which has an axially raised rim 38. A ring 34 is coaxially retained in the rim with an annular clearance 36 by a corrugated sleeve 42. The sleeve is of resilient material and frictionally engages the rim 38 and the ring 34. An integral locking tooth 44 projects from the ring 34 in a radially inward and circumferentially counterclockwise direction, as viewed in FIG. 3, for conforming engagement with a recess 32 of the weight 16'.

Engagement of the tooth 44 with the recess 32 holds the weight 16' in the illustrated operative position as long as driving torque is applied to the input shaft 10. The mode of operation of the device shown in FIGS. 3 and 4 is thus the same as that of the clutch described with reference to FIGS. 1 and 2.

The centrifugally controlled clutch illustrated in FIGS. 5 and 6 differs from that shown in FIGS. 3 and 4 by the replacement of the ring 34 with its tooth 44 and of the resilient friction sleeve 42 by a unitary leaf spring 46 which resiliently engages the inner face of the rim 38. One end of the spring 46 is bent to form a locking abutment 50 shaped and positioned to be caught in the recess 32 of the weight 16' when the latter rotates clockwise as indicated by an arrow in FIG. 5 while in the operative radial position shown.

The clutch shown in FIG. 7 has a cylindrical input member 52 which is fixedly attached to a driving shaft 54 journaled in a fixed bearing 56. The cylindrical output member 58 of the clutch is coaxial with the input member 52, but of slightly greater diameter. It is mounted on a driven shaft 59 journaled in a bearing 60 coaxial with the bearing 56.

One end 62 of a helical clamping or coupling spring 64 is attached to the axial end of the output member 58 remote from the member 52. The spring is coaxially coiled in numerous turns about the input and output members 52, 58. In the illustrated released condition of the clutch, the spring is spaced from the cylindrical contact or coupling face 66 of the input member 52. The free end 68 of the spring 64 extends radially outward from the contact face 66, and then axially beyond the input member 52 in a direction away from the output member 58.

A guide pin 70 is fastened on the driving shaft 54 in a radial position and movably engages a radial bore 73 in a centrifugal weight 72. A plate 75 on the free end of the pin 70 and a shoulder 76 in the bore 73 provide abutments for a helical biasing spring 74 coiled about the pin 70. The spring urges the weight 72 to move on the pin 70 toward the shaft 54. As seen in FIG. 8, the weight 72 has a circumferentially open recess 78 which is arranged between a locking portion of the weight and the shaft 54 to catch the free end 68 of the clamping spring 64 when the weight moves counterclockwise about the axis of the shaft 54, as viewed in FIG. 3, while the weight is in the operative position, not shown.

The clutch shown in FIGS. 7 and 8 operates as follows:

As long as the rotary speed of the driving shaft 54 does not exceed a limit that may be selected by the choice of a suitable biasing spring 74, the end portion 68 of the spring 64 clears the weight 72, and the output member 58 stands still. Upon locking engagement of the end portion 68 in the recess 78 at a higher rotary speed, the clamping spring 64 is tightened by the rotary movement of the end portion 68 and the inertial and frictional resistance of the driven load, represented in FIG. 7 by the shaft 59 and the friction of the bearing 60.

The characteristics of the clamping spring 64 are readily selected to provide smooth engagement of the clutch without shock. Such smooth engagement is favored by the relatively great length of the spring which causes the spring to be wrapped gradually about the contact face 66 in torque-transmitting frictional engagement. The resilient force of the clamping spring 64 is sufficient to retain the end portion 68 in engagement with the recess 78, and thereby to lock the weight 72 in its operative position as long as any driving torque is applied to the shaft 54.

A modified version of the clutch illustrated in FIGS. 7 and 8 is shown in FIGS. 9 and 10. The cylindrical input member 80 of the clutch is fixedly mounted on a driving shaft 82. A coaxial stub shaft 84 projecting from the input member 80 carries a radial guide pin 86 on which a centrifugal weight 88 is slidably mounted. A biasing spring 90 attached to the shaft 84 and to the weight 88 urges the latter toward the clutch axis.

The output member 92 of the clutch is tubular and rotatably supported on the shaft 82. A helical clamping or coupling spring 94 has an end portion 96 fixedly attached on the output member 92. The spring spacedly envelopes a contact or coupling face 108 of the input member 80 in the inoperative position of the weight 88 shown in fully drawn lines. The free end 100 of the clamping spring 94 extends radially outward from the contact face 108 into an axial slot 102 of a tubular housing 98 which coaxially covers the spring 94.

Three turns of a wire spring 104 frictionally engage a shallow annular groove in the outer cylindrical face of the housing 98. A locking end portion 106 of the friction spring 104 extends radially away from the housing 98 and then axially into the path of the weight 88 when the latter is in the operative position shown in dotted lines, so that the end portion 106 may be engaged in a recess 110 of the weight 88 when the latter rotates clockwise with the driving shaft 82 as viewed in FIG. 9.

At low rotary speeds of the driving shaft 82, the weight 88 is retained in the inoperative position near the stub shaft 84 by the biasing spring 90. The friction spring 104, the housing 98, the clamping or coupling spring 94, and the output member 92 stand still. When the weight 88 is shifted radially outward by centrifugal forces as the driving speed increases, the friction spring 104 turns the housing 98 while rotation of the fixed end 96 of the spring 94 is impeded by the inertial and frictional load connected to the output member 92. The clamping spring 94 is tightened about the contact or coupling face 108 of the input member 80.

The driving torque thereafter is mainly transmitted from the input member 80 to the output member 92 by the clamping spring 94, but a small portion of the torque is also transmitted by the stub shaft 84, the weight 88, and the friction spring 104, and is sufficient to hold the spring end portion 106 in locking engagement with the recess 110 of the weight 88 as long as torque is transmitted between the input and output members of the clutch.

The input member 112 of the clutch illustrated in FIGS. 11 and 12 is a circular disc which is fixedly attached to a driving shaft 114 journaled in a bearing 116. An externally threaded, generally cylindrical rim 122 on the input member 112 engages internal threads 120 of a cup-shaped shell 118 which coaxially envelopes the input member 112 and a portion of the shaft 114. The free rim of the shell 118 carries a friction facing 124.

A radial guide pin 126 is fixedly attached to the outer cylindrical wall of the shell 118 and engages a radial bore 128 of a centrifugal weight 130 which is radially movable on the pin 126. A helical compression spring 132 abuts against a shoulder 134 in the bore 128 and against a plate 136 on the free end of the pin 126. The spring 132 biases the weight 130 toward the clutch axis.

The output member 138 of the illustrated clutch is a circular disc which is mounted on a driven shaft 140 journaled in a bearing 142. A friction facing 144 is mounted on the output member 138. It has an annular coupling face 148 opposite a corresponding axially aligned face 146 of the friction facing 124 on the shell 118.

A bar 150 of resilient material is fixedly mounted on the cylindrical wall of the shell 118 and extends therefrom in a radially inward direction. The free end of the bar 150 is shaped into a hook which frictionally engages the driving shaft 114. The frictional drag of the bar 150 on the shaft 114 impedes threaded movement of the shell 118 on the input member 112.

A bracket 152 on the output member 138 carries a locking abutment 154 which extends into the path of the weight 130 when the latter is displaced radially outward from the illustrated inoperative position by centrifugal forces. A projection 156 extends circumferentially from the radially outermost portion of the weight 130 and defines a recess which is open in a circumferential and radially inward direction.

The clutch shown in FIGS. 11 and 12 operates as follows:

When the driving shaft 114 starts rotating, the input member 112 and the shell 118 rotate in unison with the shaft as long as the weight 130 is retained in the inoperative position by the biasing spring 132. As the driving speed increases, the weight 130 is shifted radially outward and circumferentially engages the abutment 154. Rotation of the shell 118 is thereby stopped or at least slowed down, and the hook-shaped end of the bar 150 slips on the driving shaft 114.

The direction of rotation of the shaft 114 and the inclination of the threads 120 are matched in such a manner that the relative rotary movement of the input member 112 and of the shell 118 causes axial displacement of the friction facing 124 toward the output end of the clutch until the coupling faces 146, 148 are engaged. The inertial resistance of the driven elements is additionally effective to rotate the shell 118 relative to the input member 112 for increasing the contact pressure between the faces 146, 148.

As soon as the abutment 154 engages the weight 130, the latter is secured against radially inward movement upon a decrease in driving speed by engagement of the locking abutment 154 with a surface of the projection 156 which is radially opposite the shell 118.

A modification of the apparatus illustrated in FIGS. 11 and 12 is shown in FIGS. 13 and 14. The input member 158 of the modified clutch is a circular disc coaxially mounted on a driving shaft 160 which is journaled in a fixed bearing 162. A threaded rim 166 on the input member 158 engages a threaded sleeve 164 fixed in a cup shaped shell 163. Pivot pins 168 axially extending from the circumference of the input member 158 carry pawls 170. Pawl springs, not shown, tend to move the tips 172 of the pawls 170 in a radially outward direction.

The free rim of the shell 163 carries a cam ring 174 whose internal cam face has a cylindrical portion, and a conical portion which flares from the cylindrical portion toward the output end of the clutch. In the released position of the clutch, the cylindrical portion of the cam face engages the tips 172 of the pawls 170 and holds them out of coupling engagement with a ratchet 184 (see FIG. 14).

The outer cylindrical surface of the shell 163 carries a centrifugal weight 176 which is arranged in the same manner as described hereinabove with reference to the weight 130 in FIGS. 11 and 12.

The output member 178 of the clutch is a disc which is fastened on a driven shaft 180 journaled in a bearing 182. The afore-mentioned ratchet 184 is coaxially mounted on the output member 178. A bracket 188 on the output member 178 carries an abutment 190 for locking engagement with a projection 192 on the weight 176. A bar 194 mounted in the shell 163 frictionally engages the driving shaft 160.

The clutch shown in FIGS. 13 and 14 operates in a manner closely analogous to that described with reference to FIGS. 11 and 12. During initial slow rotation of the shaft 160, the weight 176 clears the abutment 190. The output member 178 and the elements associated therewith stand still. At higher speeds, the shell 163 is coupled to the output member 178 when the weight 176 is engaged by the abutment 190 which also blocks radially inward movement of the weight from the non-illustrated operative position.

The ensuing relative rotation of the shell 163 and of the input member 158 causes the shell to move threadedly on the input member in an axial direction toward the input end of the clutch. The conical cam face portion of the ring 174 slides over the pawls 170 until the tips 172 engage the ratchet 184 on the output member 178. The shock of engagement of the clutch is mitigated by the frictional drag of the bar 194 on the driving shaft 160 during threaded movement of the shell 163 on the input member 158. The clutch cannot be disengaged as long as torque is transmitted from the driving shaft 160 to the driven shaft 180, and the weight 176 is thereby locked in the operative position.

It is thus a common feature of the several embodiments of the invention described hereinabove that the clutch remains engaged as long as torque is transmitted thereby from the input member to the output member. The clutch when once engaged by the action of centrifugal forces, no longer relies on these forces to remain engaged. The rotary speed of the input member may thus drop below the value set for engagement by biasing springs acting on centrifugal weights. The clutches of the invention avoid cyclic torsional stresses during the starting of an associated drive motor, and thus may be employed with relatively weak motors.

All the clutches illustrated and described automatically disengage when the transmission of torque from the input member to the output member ceases, or they may readily be modified for such automatic disengagement in an obvious manner if so desired.

Obviously, many other modifications and variations of the present invention are possible in the light of the above teachings. It is therefore to be understood that, within the scope of the appended claims, the invention may be practiced otherwise than as specifically disclosed.

What is claimed is:

1. In a clutch, in combination:
   (a) a rotatable input member;
   (b) a rotatable output member;
   (c) engageable coupling means operatively connected to each of said members, said coupling means being movable relative to each other toward and away from an engaged position in which said coupling means transmit torque to said output member when said input member rotates;
   (d) centrifugal weight means operatively connected to said input member for rotary movement about an axis when said input member rotates, said centrifugal weight means being radially movable relative to said axis;
   (e) yieldably resilient biasing means permanently urging said centrifugal weight means to move in a radially inward direction from an operative position remote from said axis toward an inoperative position adjacent said axis for holding said centrifugal weight means in said inoperative position at all rotary speeds of the weight means lower than a predetermined speed, and for permitting movement of the weight means from the inoperative to the operative position in response to centrifugal forces at said predetermined speed;
      (1) said coupling means being connected to said centrifugal weight means for movement of said coupling means into said engaged position thereof in response to movement of said centrifugal weight means from said inoperative position toward said operative position; and
   (f) locking means responsive to the transmission of torque by said coupling means from said input member to said output member for locking said centrifugal weight means in said operative position thereof at all said lower speeds thereof.

2. In a clutch as set forth in claim 1, said locking means including a locking member operatively connected to said output member for relative rotary movement of said locking member and of said weight means about said axis into a position of circumferentially abutting engagement when said input member and said output member rotate relative to each other, and said weight means is in said operative position, said weight means having a locking portion, said locking member being interposed between said locking portion and said axis when in said position of engagement.

3. In a clutch as set forth in claim 2, means mounting said members for rotation about said axis.

4. In a clutch as set forth in claim 1, said centrifugal weight means being formed with a circumferentially open recess, and said locking means including a locking member operatively connected to said output member for relative rotary movement of said locking member and of said weight means into a position of engagement of said locking member with said recess when said input member and said output member rotate relative to each other about said axis, and when said weight means is in said operative position thereof.

5. In a clutch as set forth in claim 1, said members being arranged for rotation about a common axis, and said coupling means including a helical spring secured to one of said members against rotation, and a coupling face on the other member, said spring being coiled about said coupling face; and motion transmitting means connected to said centrifugal weight means and to said spring for clamping said spring about said coupling face in response to said movement of said centrifugal weight means from said inoperative to said operative position.

6. In a clutch as set forth in claim 5, said spring being secured to said input member, and said output member having said coupling face, said centrifugal weight means being operatively connected to said input member by said spring for said rotating movement.

7. In a clutch as set forth in claim 6, a housing rotatable about said common axis, and guide means on said housing for guiding radial movement of said centrifugal weight.

8. In a clutch as set forth in claim 6, said spring having two end portions, one of said end portions being secured to said input member, and the other end portion extending radially outward from said common axis and engaging said centrifugal weight means, said centrifugal weight means being arranged for rotation about said common axis.

9. In a clutch as set forth in claim 1, said members being arranged for rotation about said axis, said locking means including a locking member and connecting means frictionally connecting said locking member to said output member for relative rotary movement of said locking member and of said centrifugal weight means about said axis into a position of circumferentially abutting yieldable engagement when said input member and said output member rotate relative to each other about said axis and said weight means is in said operative position, said weight means having a locking portion, and a portion of said locking member being interposed between said locking portion and said axis when said locking member is in said position of engagement.

10. In a clutch as set forth in claim 9, said output member having an annular face about said axis, said locking member having an arcuate portion juxtaposed to said face, and said connecting means including a friction member interposed between said annular face and said arcuate portion of said locking member.

11. In a clutch as set forth in claim 9, a spring member of elongated resilient material, a first portion of said spring member being of annular shape and frictionally engaging said output member, and a second portion of said spring member radially extending from said first portion, said first portion of said spring member constituting said connecting means, and said locking member being integral with said second portion.

12. In a clutch as set forth in claim 1, said members being arranged for rotation about said axis; said coupling means including a helical spring having two end portions, one end portion being secured to said output member, and a coupling face on the other member; said spring being coiled about said coupling face; and the other end portion of said spring extending radially outward in a direction away from said coupling face; said locking means including a locking member secured to said other end portion for relative rotary movement of said locking member and of said weight means about said axis into a position of circumferentially abutting engagement when said input member and said output member rotate relative to each other and said weight means is in said operative position, said weight means having a locking portion, said locking member being interposed between said locking portion and said axis when in said position of engagement.

13. In a clutch as set forth in claim 12, said locking member being integral with said other end portion.

14. In a clutch as set forth in claim 12, a tubular housing covering said helical spring, said other end portion being secured to said housing against rotation; said locking means including a friction member engaging said housing, said locking member being mounted on said friction member.

15. In a clutch as set forth in claim 1, said members being arranged for rotation about said axis; said coupling means including first friction facing means on one of said members, a friction facing carrier, engaged threads about said axis on the other one of said members and on said carrier, second friction facing means on said carrier axially opposite said first friction facing means; and means for threadedly moving said carrier on said threads until said first and second friction facing means engage each other in response to movement of said centrifugal weight means from said inoperative to said operative position thereof when said members move relative to each other about said axis.

16. In a clutch as set forth in claim 15, said other member being said input member, and said centrifugal weight means being secured on said carrier against rotation and radially movable thereon between said operative and inoperative positions.

17. In a clutch as set forth in claim 16, brake means interposed between said input member and said carrier for impeding relative threaded movement thereof.

18. In a clutch as set forth in claim 1, said members being arranged for rotation about said axis; said coupling means including ratchet means on one of said members and pawl means on the other member movable toward and away from a position of engagement with said ratchet means, and pawl control means connected to said centrifugal weight means for movement of said pawl means into said position of engagement thereof in response to said movement of said centrifugal weight means from said inoperative position toward said operative position.

19. In a clutch as set forth in claim 18, said pawl control means including a cam carrier, engaged threads about said axis on a selected one of said members and on said carrier, a pawl control cam mounted on said carrier and cammingly engageable with said pawls for actuating said movement thereof toward and away from said position of engagement during threaded movement of the carrier on said selected member; and threads for threadedly moving said carrier on said threads in response to movement of said centrifugal weight means from said inoperative to said operative position thereof when said members move relative to each other about said axis.

20. In a clutch as set forth in claim 19, said selected member being said input member, and said centrifugal weight means being secured on said cam carrier against rotation and radially movable thereon.

21. In a clutch as set forth in claim 20, brake means interposed between said input member and said cam carrier for impeding relative threaded movement thereof.

References Cited by the Examiner
UNITED STATES PATENTS 1,801,586   4/1931   Aseltine.
2,851,893   9/1958   Putz _____ 192—105 X DAVID J. WILLIAMOWSKY, *Primary Examiner.*